(12) United States Patent
Santos et al.

(10) Patent No.: US 6,684,218 B1
(45) Date of Patent: Jan. 27, 2004

(54) STANDARD SPECIFIC

(75) Inventors: Richard A. Santos, Roseville, CA (US); Curtis T Gross, Rocklin, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 444 days.

(21) Appl. No.: 09/718,951

(22) Filed: Nov. 21, 2000

(51) Int. Cl.[7] .............................. G06F 17/00; G06F 7/00
(52) U.S. Cl. ....................................... 707/102; 707/100
(58) Field of Search ............................... 757/3, 102, 10, 757/106; 345/700; 706/45–50

(56) References Cited

U.S. PATENT DOCUMENTS

| | | | |
|---|---|---|---|
| 5,913,215 A | * | 6/1999 | Rubinstein et al. ............ 707/10 |
| 6,052,716 A | * | 4/2000 | Gibson ........................ 709/217 |
| 6,297,819 B1 | * | 10/2001 | Furst ........................... 345/733 |
| 6,515,681 B1 | * | 2/2003 | Knight .......................... 345/751 |
| 6,519,629 B2 | * | 2/2003 | Harvey et al. ................. 709/204 |

OTHER PUBLICATIONS

Jill Ellsworth, et al. , "Internet Unleashed 1997", Sams.net Publishing, 1997, p. 374, 384, 386–387.*

* cited by examiner

Primary Examiner—Greta Robinson
Assistant Examiner—Susan Rayyan

(57) ABSTRACT

The present invention is directed to a system and method which allows a user to easily find a desired community or discussion category that pertains to a topic of interest to the user. A preferred embodiment of the invention involves a hierarchical structure for a plurality of communities and a matching engine that essentially only searches the plurality of communities. It is preferable to allow any user to extend the structure by adding new keywords and links and new communities by indexing existing or newly created communities.

17 Claims, 4 Drawing Sheets

STANDARD SPECIFIC

RELATED APPLICATIONS

The present application is related to concurrently filed and commonly assigned U.S. patent application Ser. No. 09/718,950, filed Nov. 21, 2000, entitled "DISTRIBUTED COMMUNITY DIRECTORY," the disclosure of which is hereby incorporated herein by reference.

TECHNICAL FIELD

This application relates in general to the Internet, and in specific, to a method and apparatus that allows a user to quickly locate a community of others having a like interest.

BACKGROUND

URLs, or Uniform Resource Locators, are used to locate resources on a network. A resource is an object on the Internet network or an intranet network that resides on a host system. Objects include directories and an assortment of file types, including: text files, graphics, video, and audio. A URL is the address of an object that in normally typed in the address field of a web browser. The URL is a pointer to the location of the object.

A user would locate a particular object on the Internet by using a search engine. A search engine implements an algorithm that finds information or objects on the web, e.g., ALTAVISTA, EXCITE, INFOSEEK, LYCOS, or GOOGLE. The search engine uses a spider or web crawler program to go through a data base to find information based on user-defined parameters or requests.

Another feature of the Internet is communities or discussion groups. A community is a web site or location on a web site on the Internet that is associated with a particular topic, subject, or theme. Users can go to the community and discuss or research the topic. For example, Yahoo.com has several different communities that are organized by area of interest. For example, under the Arts & Humanities section of Yahoo.com, there are about twenty six different categories of communities that a user could choose to visit. For example, a user would select the Artists category and the Masters sub-category, to view information and provide comments on Salvador Dali. If a user cannot find a particular community, the user can create a community, and place the new community in an appropriate place within the category hierarchy.

A further feature of the Internet is USENET. USENET is a news category service that facilitates discussion categories on the Internet. USENET discussion categories are based on the exchange of news articles, bulletins, and messages. The categories are an extension of e-mail messages, but are more efficient at delivering information to large categories of people. Articles and messages are put into a central database, and users access the database to read the information. Users may also access the database to provide information. News categories are organized into a hierarchy with top-level categories having names such as comp (computers), news, rec (recreation), sci (science), etc.

One main problem with these features of the Internet is finding the desired community. Originally, only USENET existed, and finding the desired community was relatively easy, as all of the information was centralized. However, as the Internet has grown, communities have become scattered across many sites. In other words, the Internet has allowed information to become decentralized. Consequently, users have a harder time finding desired communities. For example, finding a community of users to discuss the FORD THUNDERBIRD may be as easy as going to www.ford.com, because of FORD MOTOR COMPANY's well known website and presence in the marketplace. However, less obvious destination websites such as www.CarAndDriver.com or www.MotorTrend.com might host similar communities that would be of interest.

Finding communities on less common topics is generally much more difficult. Currently, the main tool for locating any internet resource is a search engine, such as those mentioned previously. The use of search engines for locating communities has major drawbacks: (1) Search engines index on literal words across all webpages and resources it can find on the internet. They are not focused on communities. Therefore, the search results are voluminous and unwieldy. In fact, most of the results are not communities. (2) Servers that host multiple discussion categories or communities may not report all of the topics to the search engine for indexing. Even working within a known category of communities is difficult. For example, YAHOO communities have to be manually searched by selecting different categories and sub-category before locating the proper category. This trial and error way of searching is time consuming and may not result in the desired community. Also the hierarchy or taxonomy of the communities is fixed. Additional communities can be added, but the structure of the categories and sub-categories is fixed and cannot be evolved or grown.

SUMMARY OF THE INVENTION

Therefore, there is a need in the prior art for a system and method that would allow a user to easily find and access communities that are associated with a particular topic or theme.

The present invention is directed to a system and method which allows a user to easily find a desired community discussion category that pertains to a topic of interest. A preferred embodiment of the invention involves a hierarchical structure for a plurality of communities and a matching engine that essentially only searches the plurality of communities. It is preferable to allow any internet user to index a community that seems pertinent into a particular location in the taxonomy or to extend the structure by adding new subcategories in the taxonomy. It is also preferable to have a moderator monitor any extensions, and potentially alter those changes to enhance the structure. This allows the communities and the community structure to evolve with changes in the topics related to the communities and the structure.

The communities are preferably organized into a hierarchical structure or taxonomy. The hierarchy would depend on the particular nature of the category of communities included in the structure. For example, categories associated with computers might be separated into two main categories, home and business, with each main category having multiple sub-category, e.g., printers, scanners, computers, display, software, etc. Each sub-category could comprise multiple sub-categories, with no arbitrary limit on the number of levels of branching. Each category or sub-category could include one or more communities, but may not contain any communities at all. For example, the business level may have communities for laptops, desktops, and personal data assistants, while the home level has no communities at that level (however, the home level's sub-category may have communities).

This structure is preferably implemented by storing the keywords, links between the keywords, along with URL links for the communities into a database. For example, a user is looking for a WINDOWS 98 community, and types in:

www.hp.com/search-communities/computer/software/operatingsystem/windows98

And the search produces the community at:

www.microsoft.com/software/windows/windows98.htm

This structure or hierarchy of the search terms typed in by the user would allow a user that is familiar with the structure to readily find a desired category with little or no searching, e.g., the user would merely type in the URL for the desired community. Exposing the hierarchical structure to the user allows the user to move up/down a level to find broader/more specific communities that are related.

The invention preferably uses a matching engine to locate desired communities within the plurality of communities. The matching engine uses a keyword matching algorithm to find communities that are related to the search criteria. The keywords are stored in the database and are associated with the URLs of the communities. In this algorithm, search terms offered to the matching engine are compared to the keywords in the database. The community database would comprise keywords associated with the different categories of the structure and the URLs of the communities that are indexed in the structure. The matching engine can locate any communities, regardless of their actual location on the internet, as long as the communities are indexed in the community database with keywords. Note that the matching engine has a much smaller keyword database than other search engines, e.g., Google.com. The keyword database consists essentially of information associated with the communities in the hierarchical structure. This allows for faster searches and yields search results that are directed to communities in specific, and not to web pages in general. Note that the URLs are also stored in the database, but are not searched by the matching engine.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
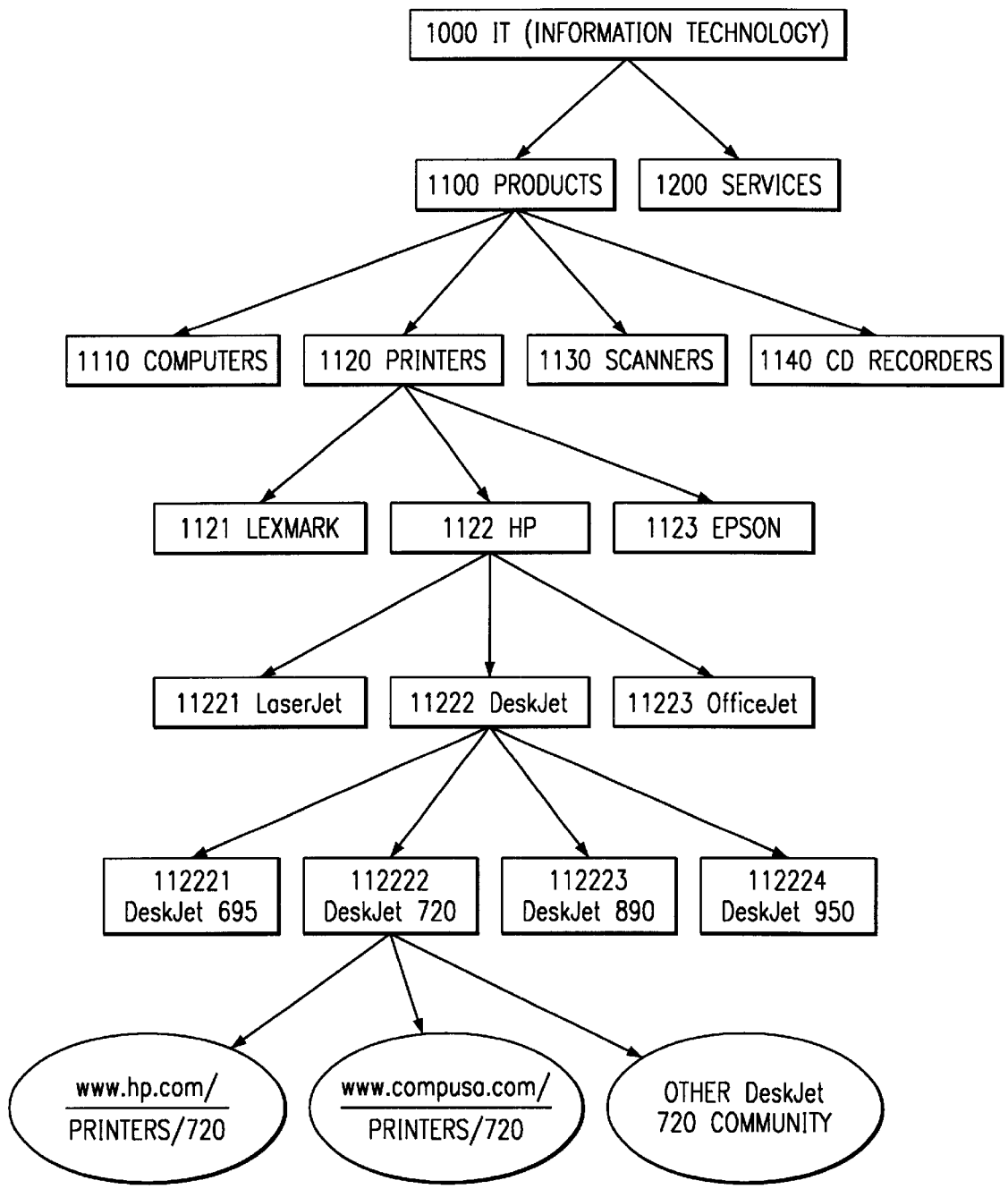
FIG. 1 depicts a first exemplary embodiment of the inventive hierarchical community structure.

The invention has different communities preferably organized into a specific, hierarchical community structure, or taxonomy. The structure categorizes topical areas and allows communities to be linked in at any category or categories. For example, FIG. 1 depicts one embodiment of a portion of a community structure for HEWLETT PACKARD (HP) product users. Note that this embodiment is by way of example only, as the communities can be arranged in a different manner and could comprise different community categories, e.g., a community for HP Vectra computer users. The structure provides a mapping from a specific area of interest to a topical area of interest. The structure also makes searching, either manually by navigation or by a matching engine, more logical and intuitive, which provides more accurate search results. Note that in FIGS. 1 and 2, the communities are shown in ovals, while the nodes of the hierarchy are shown in rectangles.

The user could locate a community about the HP DESK-JET 720 in one of two ways, or a hybrid of the two. First, the user could navigate through the structure, starting at IT=>Products=>Printers=>HP=>DeskJet=>DeskJet 720 and choose one of the three possible communities, for example the one hosted by HP. Alternatively, the user could use the matching engine 301 to more quickly locate a community by typing in a few words that indicate the area of interest. For example, the keywords HP and DeskJet 720 would be sufficient to generate the desired list of communities. The hybrid method is applicable when the keywords are not sufficient to get to the specific community list. As an example, if the search terms HP and Printer were offered to the matching engine, the results would leave the user at the node 1122. From that point the user could navigate down to the DeskJet 720 node 112222, and then to the communities connected to the node. Each node in the hierarchy represented by FIG. 1 would be assigned a unique number for database management. Those unique numbers could also be used for bookmarking, but the user should never need that information explicitly nor should it be presented. Note that the node numbering scheme is by way of example only, as other numbering schemes could be used.

Figure 2:
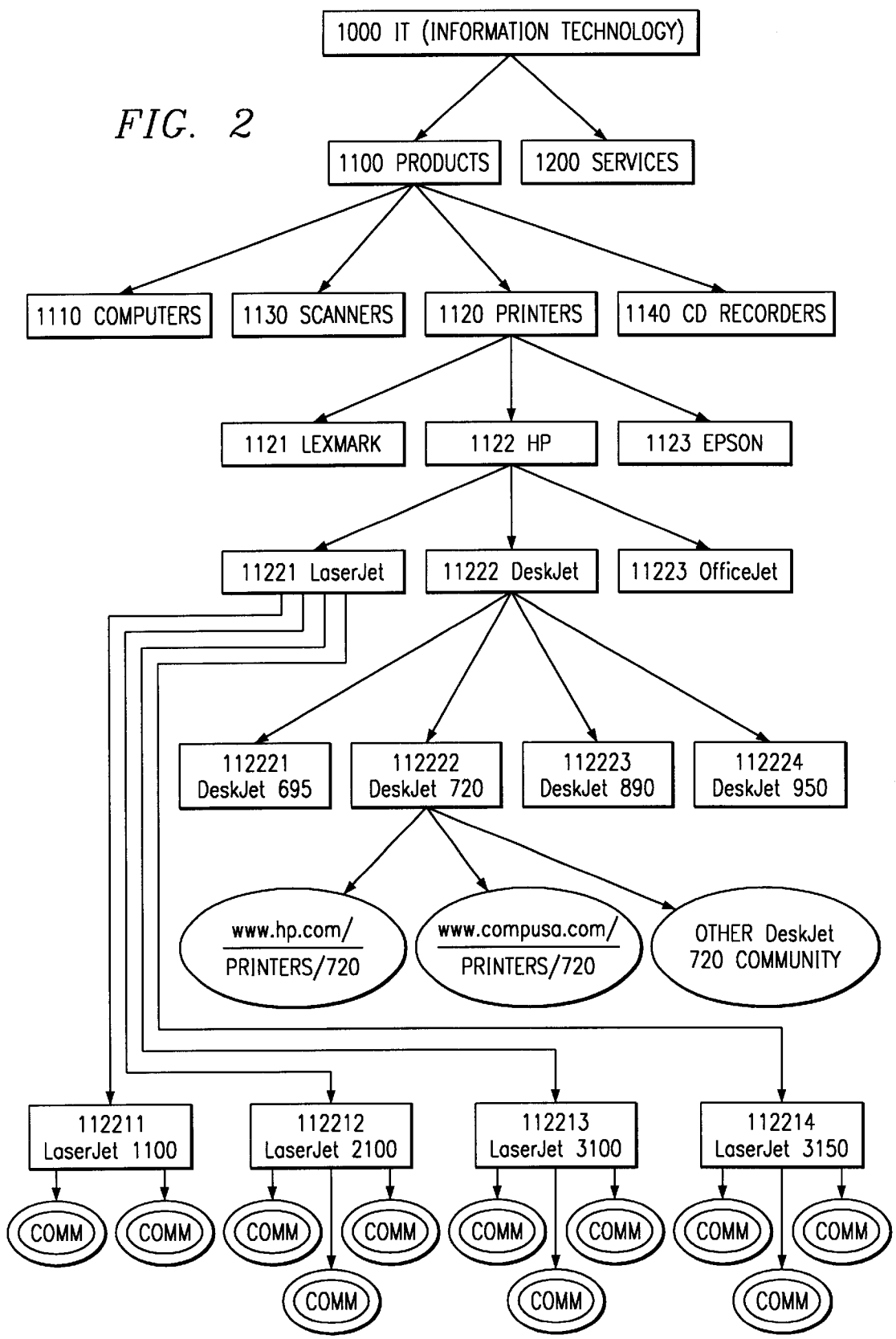
FIG. 2 depicts a second exemplary embodiment of the inventive hierarchical community structure.

If neither search method locates a desired community, the user would be given the option to create a community within the community structure. The user would then create and link the new community at an appropriate and/or desired location within the hierarchical structure. The user can also extend the structure of the hierarchy by adding nodes. For example, if a user begins to notice that the structure is becoming flat and wide, e.g., too many communities listed in the same sub-category, then the user can create new sub-categories. For example, if the structure of FIG. 1 becomes too flat, e.g., wherein /IT/Products/Printers/HP/LaserJet includes more than one hundred communities about different models of LaserJets hosted at different sites, then a user or the moderator could create new subcategories and move various communities into the appropriate subcategories. For example, as shown in FIG. 2, the structure has been modified to include an additional level of subcategories after /IT/Products/Printers/HP/LaserJet to represent each model of LaserJet instead of lumping them all together. Communities can be linked in at any of the different levels. For example, a community associated with printers in general would be linked in at the node numbered 1120, while a community associated with HP printers would be linked in at the node numbered 1122. Note that this embodiment is by way of example only, as the communities can be arranged in a different manner, and could comprise different community categories. Note that the user can create or index new communities and modify the structure to include new subcategories at the same time. The user would be provided with the necessary software tools to create communities and/or extend the hierarchical structure as desired. Note that a user can also remove communities and/or flatten the hierarchy by removing nodes. Also note that such changes can be 'undone' by the moderator.

The invention preferably uses a community steward or moderator to monitor the extensions made to the hierarchical structure and the communities linked therein. The steward would correct any changes to the structure that would make locating communities more intuitive. For example, suppose a user changes the structure of the community system from that shown in FIG. 1 to add a LaserJet 3150 community at the node numbered 1120, Printers. In this case, the steward would recognize that a better place for that community would be under the HPlLaserJet category, and perform the appropriate move. The steward could also alter changes made to the structure by users.

The structure of the hierarchy is preferably formed by storing keywords, links between the keywords, and the URL links to the communities into the database. For example, in FIG. 1, the community for the HP DeskJet 950C would have the following URL:

http://www.hp.com/communities/IT/products/Printers/HP/DeskJet/deskjet950C

This structure would also allow a user the capability to navigate through the community structure by typing in the search URL of the desired community. A user may learn the arrangement of structure through use and thus, be able to directly move to a desired community by typing in the correct keyword in the search URL. Note that a preferred taxonomy for the search URLs is to traverse from more general to more specific, e.g., transportation/automobiles/ford/thunderbird. The user may type in a speculative search URL for where they believe a community to be indexed. For example, if"www.hp.com/search-communities/red-herring/wireless-applications" is entered as a search URL, then the engine may return "www.hp.com/communities/periodicals/magazines/technology/red-herring/wireless/wireless-applications" as a search result. As another example, suppose "www.hp.com/search-communities/laserjet5P" is entered as a search URL, then the engine may return "www.hp.com/communities/product/computer/printers/laserjet/laserjet5P" as a first search result and "techrepublic.com/communities/printers/HP/laserjet5P" as a second search result. Note that the second result is a community hosted outside of HP. This indicates that the match engine can locate communities inside and outside of the HP domain, as long as the communities are indexed in the taxonomy database.

Note that the search URL typed in by the user is different from the URL of the community, or community URL. The search URL is a collection of search terms, which may or may not match an existing URL. If the search URL matches a location in the taxonomy and there are communities indexed in there, then the user is provided with those community URLs. However, if there is no community URL, then the matching engine is invoked when the 404 error ('URL not found') or other similar error is trapped by the web server. Note that the error would not have to be displayed to the user. After being invoked, the matching engine would review the search URL or search terms, and produce matching communities, if they exist. Alternatively, the matching engine could be invoked any time the user types in a search URL. This invocation could be accomplished by having the search URL start with a invocation term such as "search-communities". For example, the search URL "search-communities/printers/laserjet5P" would cause the matching engine to search for communities associated with HP laserjet5P printers.

Figure 3:
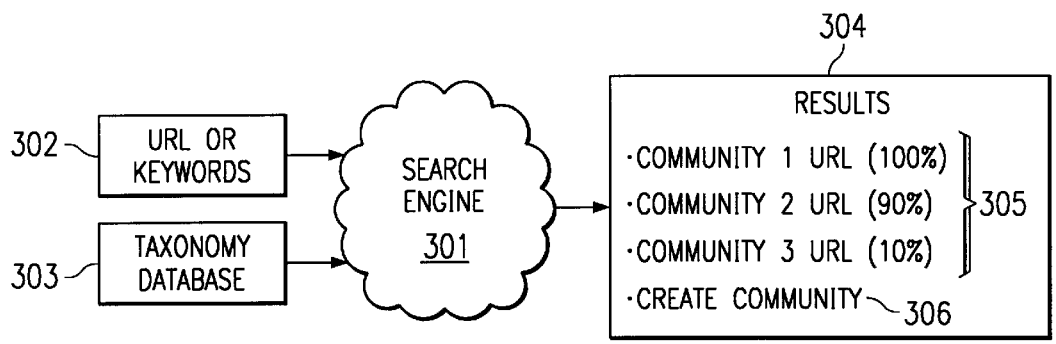
FIG. 3 depicts an embodiment of the inventive matching engine interacting with the search terms and the database to produce search results.

Additionally, a user may utilize the community matching engine 301 to locate desired communities, as shown in FIG. 3. Preferably, the matching engine receives the search terms from the URL line of the user's web browser. In the case of the input being a search URL, a list of search terms is generated from the search URL. The matching engine then matches the search terms to keywords stored in the taxonomy database 303. The matching engine then searches the taxonomy database that contains information describing the communities and the community structure and provides the results 304 to the user. The information that is searched by the matching engine is a master list of keywords that are associated with the different catagories. Each indexed community would be associated or indexed with at least one keyword. A second list, a list of links between the keywords, may also be stored in the database, and searched by the matching engine. Note that any given keyword in the master list may or may not be linked in the list of links, and that any given keyword in the master list may have multiple links in the list of links. The linking establishes a relationship between the linked keywords. The relationship forms a hierarchy of the terms, which then forms the hierarchy of the URLs associated with the keywords. For example, suppose a user types in the search terms "miami/dolphins", the matching engine may locate communities associated with the city of Miami and bottle-nosed dolphins. The matching engine would present communities from both catagories to the users. However, the list of links would allow the matching engine to look for communities having both terms, and in a particular hierarchical order. The communities that have keywords that are closest to the number and order of the search terms could be assigned a rating or score 305 as to how close a particular community matches the user's search terms. The matching engine can be configured to search the database looking for matches, near matches, and words related to the offered search terms. The matching engine also preferably presents the user with the option to create a community 306 if the search results do not provide the desired community (and/or the results included no matches).

Figure 4:
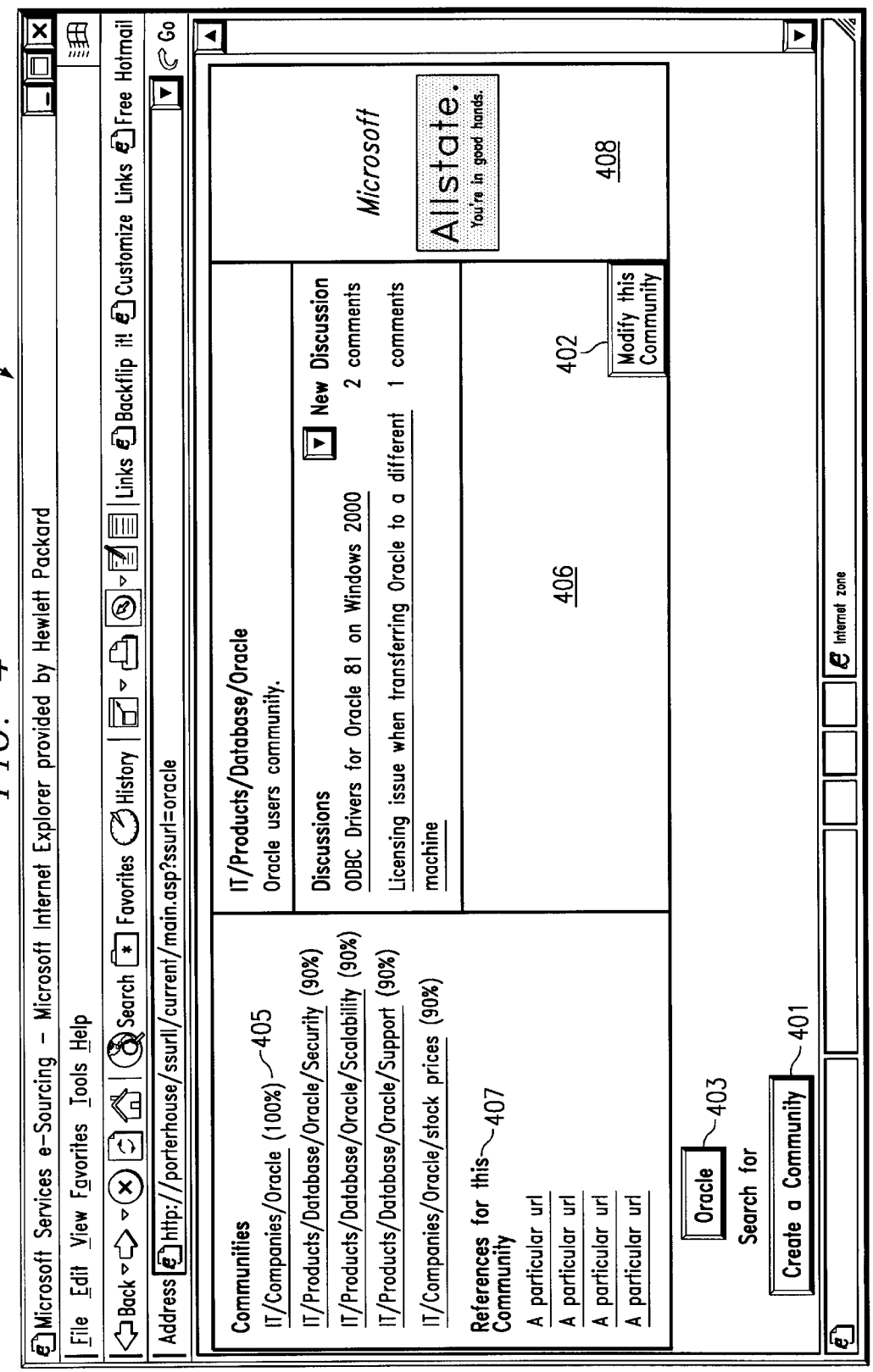
FIG. 4 depicts an exemplary embodiment of a graphical user interface for interfacing with the invention.

FIG. 4 depicts an example of a graphical user interface (GUI) 400 that allows the user to input search terms, view and/or select results, and change the structure by adding a community or changing the structure of the communities. The GUI includes buttons for creating a community 401, modifying a selected community 402, and a text box 403 for inputting search terms, e.g., URLs and/or keywords. A results portion 404 of the GUI displays communities that matched the search terms. As an example, FIG. 4 depicts a search for communities associated with the term Oracle. Note that this is by way of example only as other terms could be used which would have different results. A community portion 406 displays the postings for the selected community 405. Other portions may display other information. For example, recommended sites portion 407 may display web sites related to the selected community 405. These sites may be recommended by community members or may contain an entry reference to the community. Another portion 408 could be used for advertising. Selecting the buttons to create a community 401 and modify a community 402 would take the user to different GUI screens (not shown). This would allow the user to create a new community and place it within the existing structure (401), or to modify the structure by changing a location of an existing community within the community structure (402).

Note that the matching engine uses a much smaller database than other search engines, e.g., Google.com. The database consists essentially of information associated with the communities in the hierarchical structure. The database should not include information about web pages that are not associated with communities. Thus, the matching engine will not match words in web pages like standard search engines, e.g., google.com. The taxonomy database may include information about pages that are not communities but are associated with communities. For example, a web page that has an entry point into a community and/or communities may have information indexed into the database. The smaller database results in faster and more accurate searches. Also note that the database would also contain the URLs of the communities, but the URLs are preferably not searched by the matching engine.

The database may comprise other keyword information in addition to and/or instead of the URL based keywords. For example, the database may include keywords associated with the non-location aspects of the communities of the structure. Keywords could comprise product names and/or models, corporate names, articles and/or publications, websites, topical areas of interest, etc. For example, a community associated with breast cancer may be indexed into the hierarchy at . . . /medicine/diseases/cancer/breast. The keywords are medicine, diseases, cancer, and breast. The linking is the definition of the relationships between the words, for example the relationship between medicine and diseases. The relationship is that diseases is a sub-category of medicine.

Note that the application has discussed the invention in terms of the HP website, www.hp.com. However, this is by way of example only, as the invention can operate on other web sites. Also, describing the invention using HP products is by way of example only, as communities can be formed based on any topic of interest to people, including but not limited to science, math, nature, politics, technology, health, entertainment, news, business, law, travel, food, art, books, weather, farming, games, shopping, religion, sports, education, social science, world countries, consumer products, etc.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 5:
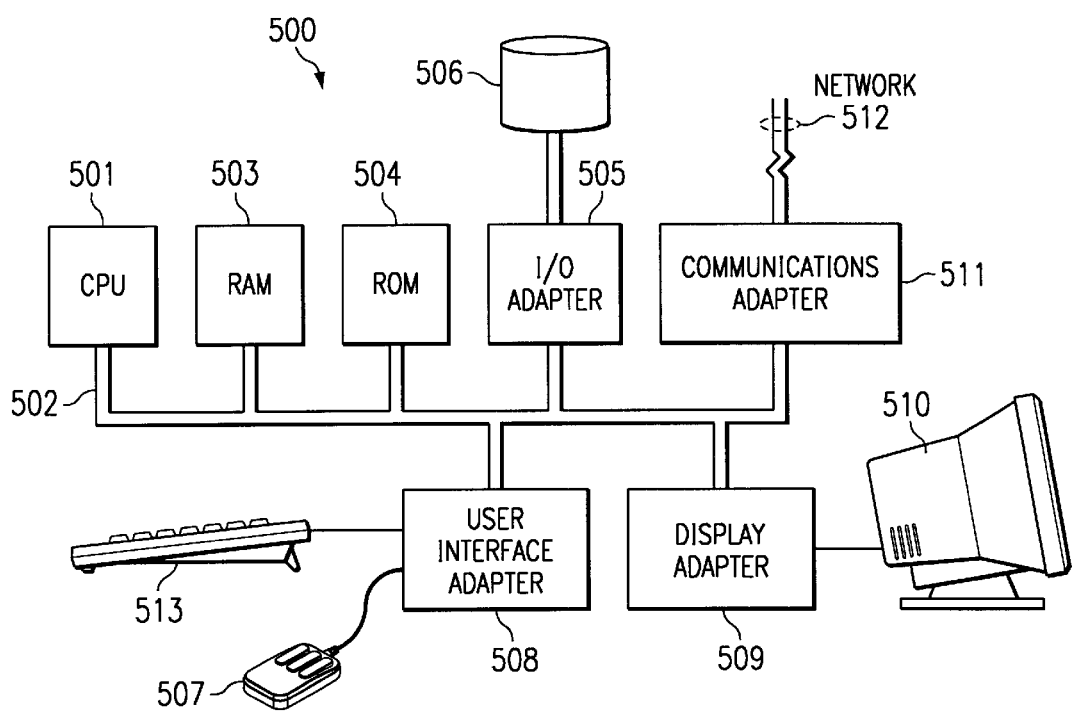
FIG. 5 depicts a block diagram of a computer system which is adapted to use the present invention.

FIG. 5 illustrates computer system 500 adapted to use the present invention. Central processing unit (CPU) 501 is coupled to system bus 502. The CPU 501 may be any general purpose CPU, such as an HP PA-8500 or Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O card 505 connects to storage devices 506, such as one or more of hard drive, CD drive, floppy disk drive, tape drive, to the computer system. Communications card 511 is adapted to couple the computer system 500 to a network 512, which may be one or more of telephone network, local (LAN) and/or wide-area (WAN) network, Ethernet network, and/or Internet network. User interface card 508 couples user input devices, such as keyboard 513 and pointing device 507, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network community system comprising:
   a plurality of communities arranged in a hierarchical structure;
   a database consisting essentially of information associated with the plurality of communities; and
   a matching engine that searches a portion of the information in the database to attempt to locate at least one community of the plurality of communities that is similar to search criteria
   wherein a user can make a modification to the hierarchical structure, and a moderator can modify the modification made by the user.

2. The network community system of claim 1, wherein the modification comprises:
   a user can index a new community into the database and locate the new community within the hierarchical structure.

3. The network community system of claim 2, wherein the modification comprises:
the network community system is located on a first web site, and the new community is located on a second web site.

4. The network community system of claim 1, wherein:
a user can add a new community to the plurality of communities, index the new community into the database, and locate the new community within the hierarchical structure.

5. The network community system of claim 1, wherein:
the hierarchical structure is characterized in the database as a plurality of keywords, wherein at least one keyword is linked to another keyword thereby establishing a relationship between the one keyword and the another keyword.

6. The network community system of claim 1, wherein:
the portion of the information is at least one keyword.

7. The network community system of claim 6, wherein:
the one keyword corresponds to a portion of a search URL for a community of the plurality of communities.

8. The network community system of claim 1, wherein:
the information includes a plurality of community URLs with each community URL, with each URL being associated with a particular community of the plurality of communities.

9. The network community system of claim 8, wherein:
a user provided the search criteria to the matching engine, and
when the matching engine locates at least one community of the plurality of communities that is similar to the search criteria, the matching engine provides the URL of the one community to the user.

10. A computer program product having a computer readable medium having computer program logic record thereon for operating a network community system, the computer program product comprising:
code for providing a plurality of communities arranged in a hierarchical structure;
code for facilitating a user to make a modification to the hierarchical structure; and
code for facilitating a moderator to modify the modification made by the user.

11. The computer program product of claim 10 wherein the code for facilitating a user comprises:
code for indexing a new community into the database and locating the new community within the hierarchical structure that is operable by a user.

12. The computer program product of claim 10 wherein the code for facilitating a user comprises:
code for adding a new community to the plurality of communities, indexing the new community into the database, and locating the new community within the hierarchical structure that is operable by a user.

13. The computer program product of claim 10 wherein:
the hierarchical structure is characterized in a database as a plurality of keywords, wherein at least one keyword is linked to another keyword thereby establishing a relationship between the one keyword and the another keyword.

14. The computer program product of claim 10 further comprising:
code for describing a database consisting essentially of information associated with the plurality of communities; and
code describing a matching engine that searches a portion of the information in the database to attempt to locate at least one community of the plurality of communities that is similar to search criteria;
wherein the portion of the information is at least one keyword.

15. A method for operating a network community system, comprising:
describing a plurality of communities arranged in a hierarchical structure;
providing a database that consisting essentially of information associated with the plurality of communities;
providing a matching engine that searches a portion of the information in the database to attempt to locate at least one community of the plurality of communities that is similar to search criteria;
receiving at least one search term from a user;
searching, via the matching engine, the database for keywords that are similar to the one search term;
providing at least one community URL from the database for a community that has at least one keyword similar to the one search term to the user;
making a modification to the hierarchical structure by a user; and
modifying the modification made by the user by a moderator.

16. The method of claim 15 wherein making the modification comprises:
indexing, by the user, a new community into the database; and
locating, by the user, the new community within the hierarchical structure.

17. The method of claim 15 wherein making the modification comprises:
adding, by the user, a new community to the plurality of communities;
indexing, by the user, the new community into the database; and
locating, by the user, the new community within the hierarchical structure.

* * * * *